Oct. 14, 1969  L. D. BARRY  3,472,322
AUTOMATIC FARMING SYSTEM
Filed Feb. 17, 1967  6 Sheets-Sheet 1

INVENTOR.
Leonard D. Barry

Oct. 14, 1969    L. D. BARRY    3,472,322
AUTOMATIC FARMING SYSTEM
Filed Feb. 17, 1967    6 Sheets-Sheet 2
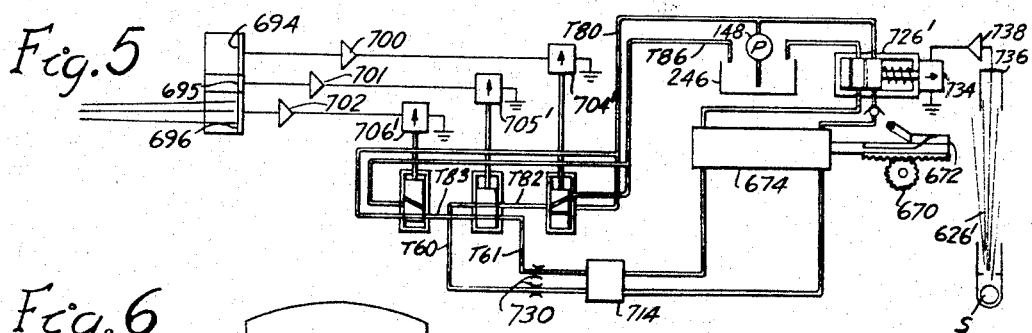
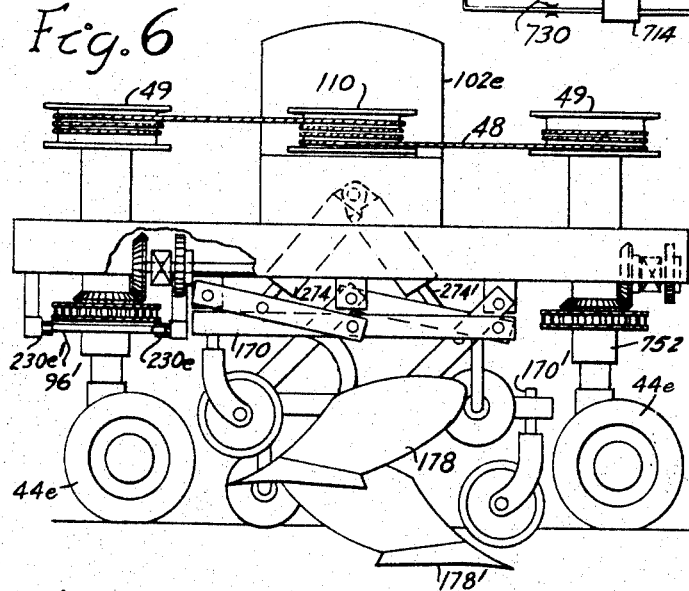
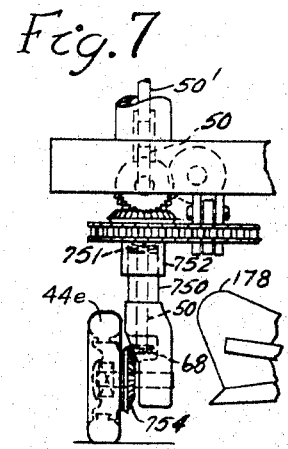
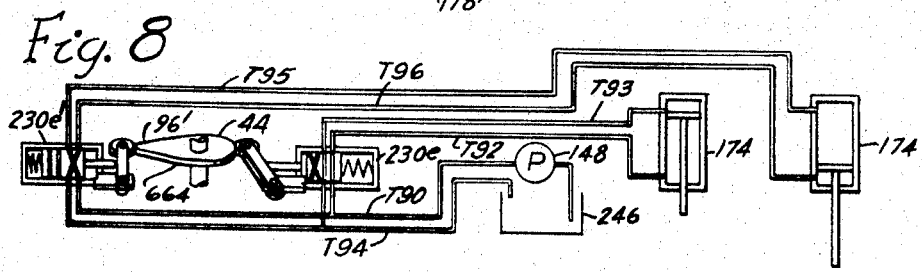
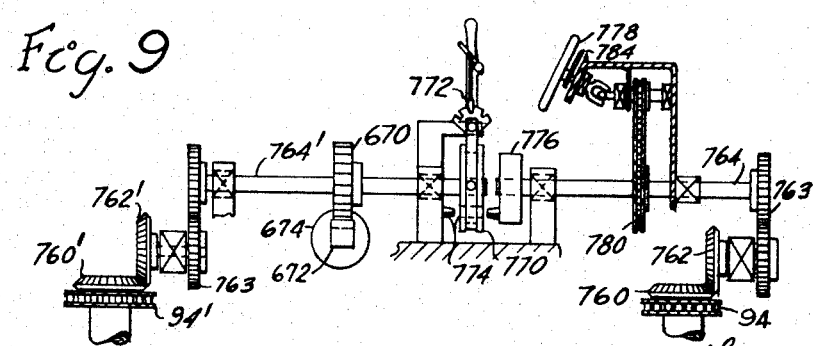
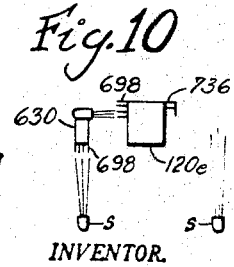
INVENTOR.
Leonard D. Barry Oct. 14, 1969  L. D. BARRY  3,472,322
AUTOMATIC FARMING SYSTEM
Filed Feb. 17, 1967  6 Sheets-Sheet 5

INVENTOR.
Leonard D. Barry

Oct. 14, 1969  L. D. BARRY  3,472,322
AUTOMATIC FARMING SYSTEM
Filed Feb. 17, 1967  6 Sheets-Sheet 4

INVENTOR.

Leonard D. Barry

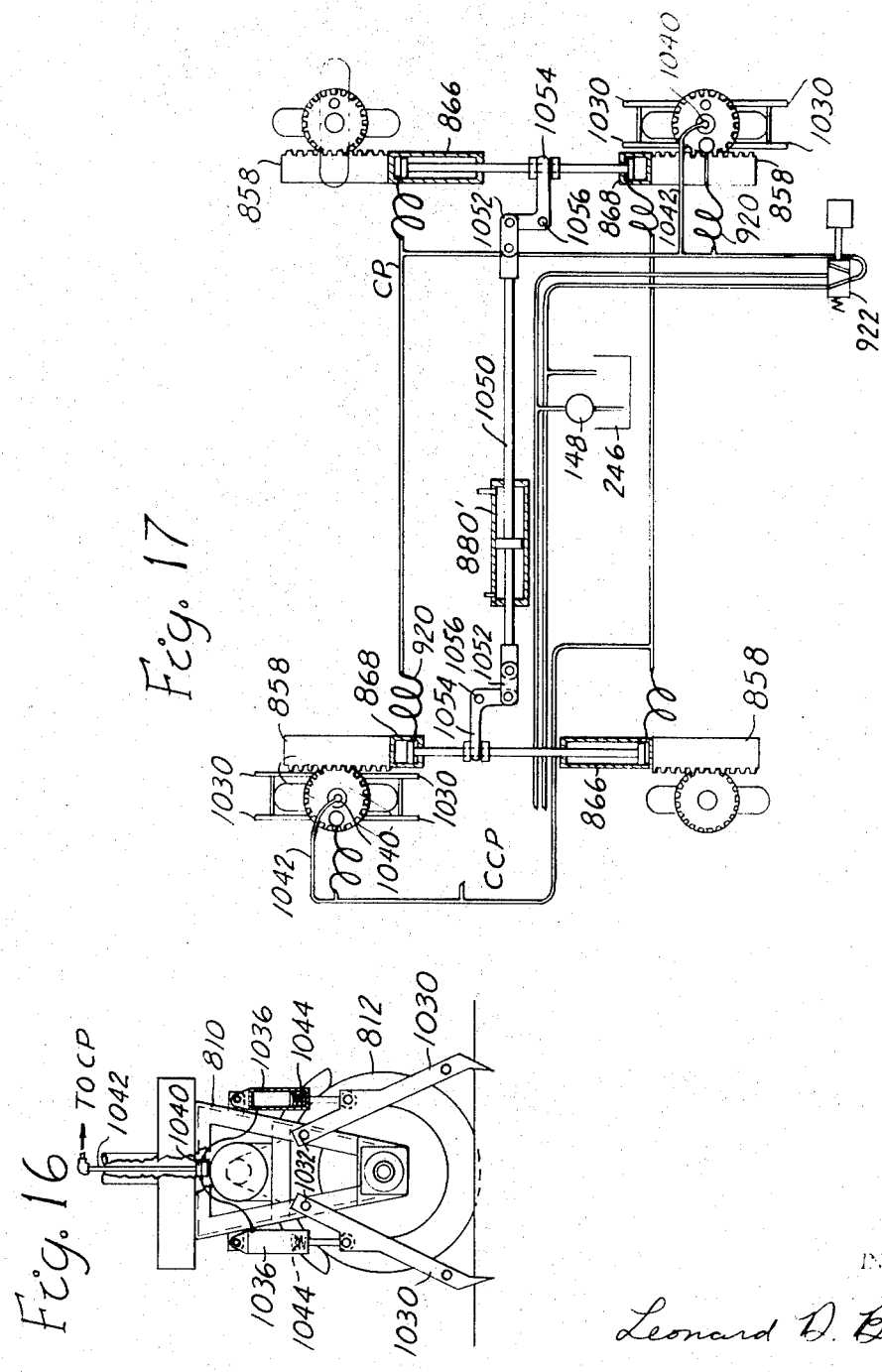

United States Patent Office 3,472,322
Patented Oct. 14, 1969

3,472,322
AUTOMATIC FARMING SYSTEM
Leonard D. Barry, 19300 Pennington Drive,
Detroit, Mich. 48221
Continuation-in-part of application Ser. No. 445,874,
Apr. 6, 1965. This application Feb. 17, 1967, Ser.
No. 629,844
Int. Cl. A01b 69/00; B62d 5/04, 5/06
U.S. Cl. 172—26                                    24 Claims

ABSTRACT OF THE DISCLOSURE

This is a tractor and controls for tilling a field in runs back and forth featuring self turning, reversing or indexing, and lifting and repositioning of implements at the end of each run according to a preset turning pattern of the tractor to bring the tractor and implements into position for the return run. The preferred tractor has four-wheel drive and steering, light or laser beam steering control for each tilling run or selectively other automatic or manual guidance along each run, two-directional guidance on each guide means so that a round trip is made on each guide position, shift of implements when turning, cross beam control for lifting implements and turning at ends of runs for tilling, steering which turns to preset positions to make similar turns to carry the tractor to a predetermined position for each successive run across the field, and frame shape to carry truck body and steering to operate lengthwise on roads and sidewise on the field.

This is a continuation-in-part of my application Ser. No. 445,874, filed Apr. 6, 1965, now abandoned, which is a continuation-in-part of my application Ser. No. 373,176 and 811,500 filed Aug. 10, 1953, and May 6, 1959, respectively now abandoned and Patent No. 3,186,-493, respectively.

This invention relates to farming systems and devices and in particular to novel means whereby farming implements can be automatically propelled, guided, and controlled while tilling or otherwise functioning on the land.

An object of this invention is to provide a practical and novel system and devices for automatically tilling a field.

Another object is to provide novel means to automatically guide a device in a succession of rows across or along a field.

Another object is to provide a tilling device that automatically moves back and forth between limits of travel and indexes to follow a parallel path selectably at one or both limits of travel for respectively use with one and two-way implements.

A further objects is to provide an improved tiller which not only is steered automatically on a field but one which can be manually steered for operation to operating position or on roads, and further to provide a tractor which can be either manually or automatically steered according to the type of work being done to enable the tiller to do all the jobs of a farm tractor as well as automatic cultivation.

It is an object to provide novel guide and steering arrangements and control means to reverse the tiller without reversing the direction of rotation of its drive to enable utilization of a simple drive and to simplify steering requirements for automatic operation.

A further object is to provide novel drive systems and controls for propelling and controlling farming devices according to this invention.

Other and further features and objects of this invention will be pointed out herein or be apparent to those skilled in the art upon consideration of the specific embodiments described herein and illustrated in the accompanying drawings wherein:

FIGURE 5 is a schematic diagram of a variation of a portion of FIGURE 3.

FIGURE 6 is a side elevation of the tiller of FIGURE 1.

FIGURE 7 is a front elevation of a portion of the tiller shown in FIGURE 6.

FIGURE 8 is a schematic diagram of the preferred hydraulic controls for the implement lift cylinders on directional-implement-alternating tillers.

FIGURE 9 is a schematic diagram of the steering arrangement for combining manual and automatic steering on the parallel indexing tillers.

FIGURE 10 is a schematic plan of a field with a tiller car and control truck with light or laser beams shown for guiding the same.

FIGURE 16 is a side view of a caster of the tiller with ground clamps added.

FIGURE 17 is a schematic plan of a variation of the steering of FIGURE 15 with the ground clamps shown.

Figure 4:
FIGURE 4 is a vertical section lengthwise through the steering rack showing the lock ratchet and reverse steering control valve. The cycle of movement of the ratchet is indicated by arrows.
Figure 3:
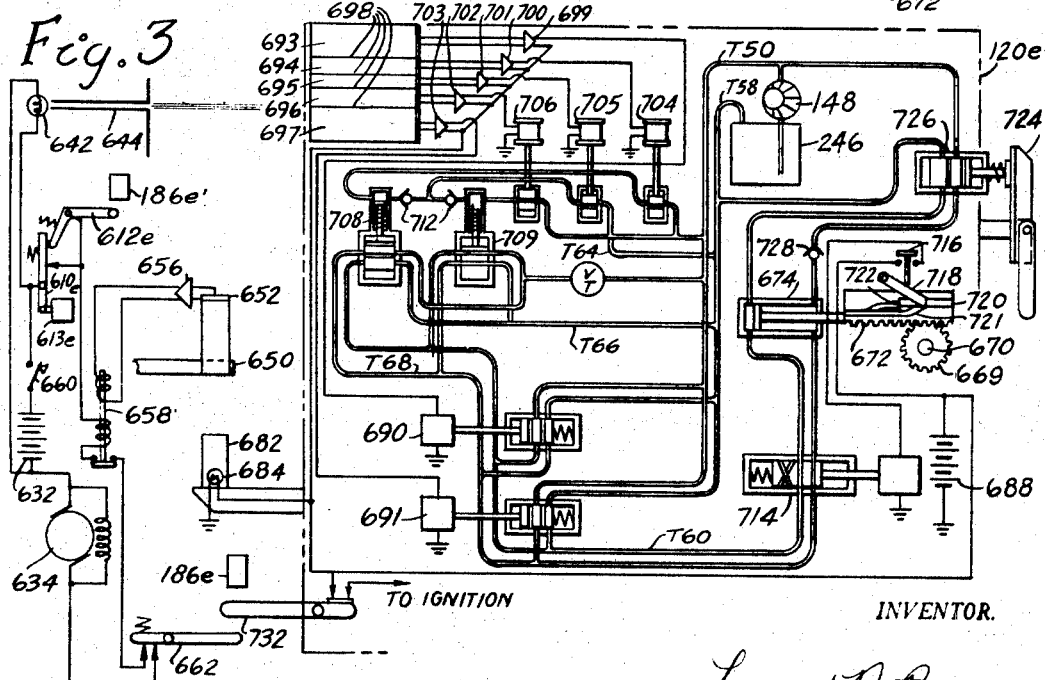
FIGURE 3 is a schematic diagram of the controls for the tiller shown in FIGURE 1.

Referring to the drawings and in particular to FIGURES 1–4 and 6–8, implement car or tiller 120e has a frame 164e supported on four swivel casters 44e powered by engine 102e through transmission, pulleys, belts, shafting and gearing similar as in FIGURE 4 of my Patent No. 3,186,493. Each caster 44e has a sprocket 92e secured concentric to the swivel bracket thereof. The casters are aligned and connected by chain 94e around the sprockets to maintain alignment. A sprocket 668 engages chain 94e for steering the four casters together. Sprocket 668 and a spur gear 669 are secured on shaft 670 to turn together on the frame of the tiller. Gear rack 672 is engaged with spur gear 669 and secured on the rod of cylinder 674 secured to the frame of the tiller for steering. The tiller will not be turned around by this drive, since the casters all turn together the same amount and their wheels rotate at the same speed in the same direction in parallel planes. The tiller is controlled to index and steer by pivoting the casters so the drive can operate continuously without reversal of direction. The pivot axis of the casters preferably goes through the middle of the wheel assembly.

Along one boundary of an area to be tilled are laid lengths of half-inch pipe to form a portable track 624. A bump rail or fence 626 can provide the opposite boundary. A control vehicle, herein called a truck 630, has four tireless bicycle wheels 640 two on track 624 and two connected by a rubber hose track 641. Truck 630 is propelled by gearmotor 634 through chain and sprocket drive 636 about axle 638 to which two wheels 640 are secured. The truck carries a light or laser or other source of radiant energy 642 or shielding or laser 644, for directing the energy into a narrow beam, sheet or ribbon standing on edge to guide car 120e between truck 630 and stop 626. A light baffle 648 at side of light 642 blocks stray rays in line with the light source. Light 642, shielding or laser 644, and baffle 648 (optional) are supported on an upright member 651 which can swivel and lock at any desired angle with respect to track 624 to direct car 120e along the desired angle of working.

Lamp 684 is mounted on arm 686 extending from the end of car 120e which faces truck 630 and directs light parallel this end of the car to shine on photoelectric cell 652 mounted on arm 650 extending from truck 630. The photocell is connected to amplifier 656, whose output is connected across the coil of relay 658, which closes front contacts when light 684 shines on cell 652. Relay 658 closes a circut from the positive of battery 632, FIGURE 3, switch 660, limit switch 610e, hold coil of relay 658, switch 662, motor 634, all in series to the negative of battery 632. Truck 630, then runs along track 624 until, after a predetermined index, this circuit is opened at switch 610e by switch arm 612e connected in parallel with 610e and opened by either a revolving arm rotated by movement of the truck as arm 259 in FIGURE 11 of my Patent 3,186,493 or by index-stops 186e' which are posts placed in the ground at the desired intervals to stop the control truck. In either case switch 612e holds the motor circuit closed until its arm is released by its actuator. Switch 610e is delayed from closing by dashpot 613e until the implement car has time to move from the truck, removing light 684 from cell 652, dropping relay 658, leaving the motor circuit open after switch 610e recloses.

The tiller is steered by light from source 642 directed to one or more of five vertical photoelectric cells 693, 694, 695, 696, and 697 having shielding with partitions 698 between the cells. The output of each cell 693-697 is amplified by amplifier 699-703 respectively. Across each amplifier 700-702 is connected a two-port normally-closed solenoid valve 704, 705 and 706 respectively to operate when the narrow steering cell 694, 695, or 696 receives light from lamp 642. Valves 704, 705, and 706 control pilot valves 708 and 709 by connections from tank 246 to inlet of pump 148, and from the outlet of pump 148 by line T50, T to valve 704, to the head end of the control cylinder of valve 708 and a T from line T50 to valve 706, to the head end of the control cylinder of valve 709. The control cylinders of valves 708 and 709 are exhausted to tank from the head end respectively each through a check valve 712 whose outlets are T'd to line T64 to valve 705, whose outlet is T'd to line T58, to tank 246. Check valves 712 prevent flow between cylinders of valves 708 and 709. Valves 708 and 709 are spring returned two-position two-passage normally closed pilot valves shown in normal position and control cylinder 674 during steering along the rows. Hydraulic connections are made from pump 148, line T50 with T's to the normally closed inlets of valves 708 and 709. Normally-closed exhausts of valves 708 and 709 are T'd together to line T66, line T58, to tank 246. When valve 708 is energized it opens passage from line T50 to line T68 to the inlet of a reversing four-way spring-returned solenoid valve 714, which connects line T68 in deenergized position to the left end of cylinder 674 which exhausts the opposite end through valve 714, line T60, valve 708, line T66, line T58 to tank 246 to turn the casters clockwise. Flow is in the reverse direction from valve 709 when energized with valve 708 deenergized to and from cylinder 674 to turn the casters counterclockwise. An adjustable orifice or needle valve VT on the line to valves 708 and 709 controls steering speed.

For indexing and reversing the tiller, quick turning of the casters is provided for by two double-passage two-position normally-closed solenoid valves 690 and 691 energized to open to make connections in parallel across respectively valves 708 and 709 and their restrictions valves VT, to pass a large volume of fluid for quick operation of cylinder 674. The solenoids of valves 690 and 691 are connected across amplifiers 699 and 703 respectively, so that when light 642 hits cell 693 valve 690 is energized, connecting pressure to turn the leading face of the wheels up in FIGURE 3 and start the index. Light 642 on cell 697 energizes valve 691 to complete the index as will be explained.

The light of source 642 is intended to be narrow enough to reach only one or two adjacent cells 693-697 at a time, but if cells 694 and 696 receive the light so does cell 695, opening valve 705, exhausting pilot cylinders of both valves 708 and 709 closing these valves, whereupon steering is held as is. Whenever light reaches cell 695 the indication is that the tiller is on the beam.

The casters are steered to follow light 642 when going both to and from the control truck, therefore, since the casters have turned 180 degrees to make the return trip the effect of cells 694 and 696 must be reversed at the truck and at the fence. Accordingly, in one direction of tilling, reverse valve 714 is positioned to reverse flow from valves 708 and 709 before admission to cylinder 674. The position of valve 714 is controlled by limit switch 716 lifted to open by pawl 718 which rides alternately two cam track grooves 720 and 721 lengthwise on steering rack 672. As the rack moves to opposite ends of travel the pawl drops into alternate grooves. The grooves 720 taken by the pawl when the casters are turned to index the tiller has a drop-off or ratch 722 which drops pawl 718 and closes switch 716, reversing valve 714 to reverse pressure in cylinder 674, which locks the steering on the ratch during the index. The grooves are cut deep enough from about the middle of the rack and from the drop-off to one end to keep switch 716 closed and shallow enough to keep switch 716 open on the other end. The return groove 721 cams the pawl up opening switch 716.

The tiller is controlled to reverse its direction of movement when one-way jointed lever 724 on car 120e hits fence 626 opening spring-closed double-passage valve 726, admitting fluid from pump 148 to the right-hand end of cylinder 674 through check valve 728 to move the piston of cylinder 674 to the left end quickly, turning the casters approximately 180 degrees in a direction opposite to that taken for indexing whereby the rack is ready for another cycle of caster movement. If 724 drops over the fence it pivots at its joint to back off when the tiller is reversed.

Figure 1:
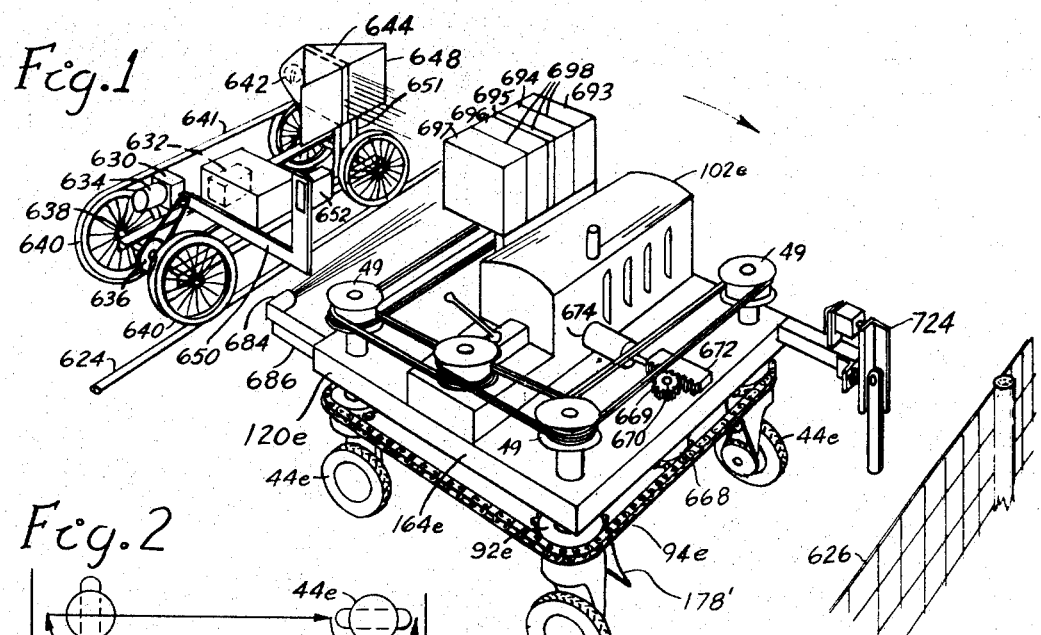
FIGURE 1 is a diagrammatic perspective view of a light-beam or laser guided tiller.
Figure 2:
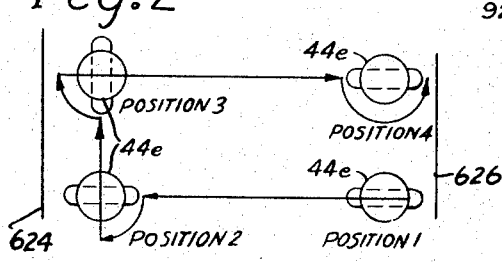
FIGURE 2 is a sequence diagram illustrating the cycle of caster movements for the tiller.

FIGURE 2 shows the cycle of movement of the tiller represented by a caster 44e. The movement starting with position 1 at the fence is substantially straight to position 2 as guided by light 642 through action of the light on cells 694-696. When the tiller approaches the truck, cell 652 is energized by light 654, initiating the index of the truck. When lamp 642 moves to the right in FIGURE 1 it energizes cell 693, energizing the solenoid of valve 690, opening pressure to the head end of cylinder 674, forcing the piston out, turning gear 670 and the sprockets on the casters clockwise about 90 degrees until pawl 718 drops at 722, closing switch 716, reversing solenoid valve 714 to pressure the rod end of cylinder 674, which tries to turn the casters counterclockwise but is held by the pawl engaging ledge 722. The swivel is quick before light 642 leaves cell 693, and the steering is locked for the index. Control truck 630 indexes at the same speed or faster than the tiller and stops when switch 612e opens. The tiller continues until light 642 hits cell 697, opening solenoid valve 691, connecting pressure to the head end of cylinder 674, completing at position 3 the remaining approximately 90 degrees of the 180 plus degrees turn of the casters limited by the ends of travel of piston 674. When valve 762 is opened by engaging fence 626 or other means cylinder 674 is quickly reversed pivoting the casters as shown at position 4.

During this reversal switch 716 is opened by pawl 718 reversing valve 714 for reversing the steering control for the return run on the same light beam. When tilling is done, lever switch 732 hits stop 186e and opens the ignition circuit.

As shown in FIGURE 5, a beam of light 626' from source S can be substituted for the fence or bump rail 626 as a stop. Accordingly valve 726' is operated by a solenoid 734 connected to a photo-electric cell 736 preferably through an amplifier 738. Photoelectric cell 736 is shielded and positioned on the tiller to intercept the beam for source S which is positioned by the farmer to shine along the end of the area to be tilled.

FIGURE 5 also shows a variation of the photoelectric steering controls for the tiller. Connection is made from pump 148 to line T80 T'ing to inlets of valves 704' and 706' blocked in normal position but connected to outlet lines T82 and T83 respectively when the valves are in energized position. Lines T82 and T83 are connected through valve 705' in normal position respectively to lines T60 and T61 which are connected through valve 714 as in FIGURE 3 to operate cylinder 674. Valves 704' and 706' connect respectively lines T82 and T83 to lines T'ing to line T86, to tank 246. Valves 704', 705', and 706' are connected each in a usual electrical circuit to be controlled by photoelectric cells 694, 695, and 696 respectively. When light energizes cell 694, valve 704' is lifted, connecting fluid from pump 148 to line T82 through valve 705' when cell 695 is not energized, to pressure the end of cylinder 674 to steer the tiller so that light will reach cell 695. When light energizes cell 696, valve 706' is lifted, connecting fluid from pump 148 through valve 705' when cell 695 is not energized, to pressure the opposite end of cylinder 674 and exhaust the other end. When light energizes cell 695, valve 705' is lifted to block the flow and hold the piston of cylinder 674 in position. Orifices 730 are provided to control the speed of steering.

The preferred arrangement for automatically operating the implement lifts 170 and 170' pivotally secured to the bottom of car 120e is explained with aid of FIGURES 6 and 8. The circular base of a wheel bracket on a caster 44e has a lobe 96' for actuating similar four-port reversing cam valves 230e and 230e' to control pressure to implement lift cylinders 174 and 174' respectively according to the swivel position of the casters. The cam valves are positioned on opposite sides of the swivel bracket so that valve 230e' is actuated by lobe 96' when the vehicle is moving in the direction of the arrow in FIGURE 1 and so that valve 230e is actuated when the casters are reversed 180 degrees, that is when the vehicle is moving in the opposite direction. In the normal position of valve 230e shown, connection is from pump 148, line T90, T'ing to inlet of valve 230e, to line T92, to the rod (lift) end of cylinder 174, whose head is connected by line T93 to valve 230e, exhausting to line T94, to tank 246, to hold implement 178 lifted as the tiller moves to the right. In the engaged position of valve 230e' shown, connection is from pump 148 to line T90, T'ing to the inlet of valve 230e', to line T95, to the head end of cylinder 174', whose rod end is connected by line T96 to valve 230e', exhausting to line T94, to connect pressure to the lowering end of cylinder 174' to hold the plow or implement 178' in ground working position while the tiller moves to the right. When the tiller casters turn from right-angle movement of any other angle of tilling selected for operation between track 624 and stop 626 both implements are lifted.

Referring to FIGURES 6 and 7, the caster swivel brackets have an upper hollow tube 750 which rests on spring 751 pocketed to vertically slide in tube 752 and to turn therewith. Through this tube extends shaft 50 to drive the caster wheel preferably by beveled gear 68 secured to the bottom of shaft 50, engaging a beveled gear 754 formed as an integral part of the caster wheel concentric on one side thereof as shown. Shaft 50 is splined to telescope on an upper hollow tube, shaft 50', on which is secured a drum or other means 49e for driving the caster wheel. Springs 751 improve the riding quality.

FIGURE 9 discloses a system for transferring the steering of the tilling vehicle between the four-wheel swivel arrangement (all wheel steering) for automatic operation and the conventional front wheels only (end wheels) steering. The front swivel casters are connected in alignment to turn together by chain 94 secured around the sprockets thereon. Likewise the rear swivel casters are connected together by chain 94' or other nonslip means, beveled gears 760 and 760' are secured to turn on the axis of and as an integral part of a front and a rear caster swivel respectively, bevel gears 760 and 760' engage respectively beveled gears 762 and 762' on the same side thereof. Gears 762 and 762' are respectively connected by spur gears or other nonslip means 763 respectively to shafts 764 and 764', which shafts are aligned and supported in bearings to the frame of the tiller. A two-faced clutch 770 is splined for axial movement on shaft 764' and actuated by shift yoke and lever 772 to engage the frame of the tiller when the clutch is moved to the rear or to engage shaft 764, preferably through clutch 776 secured on shaft 764, when clutch 770 is moved to the front of the tiller. A steering wheel 778 is connected by chain and sprocket or other suitable means 780 to turn shaft 764 to steer the vehicle manually. One or more pins and holes 774 in the faces of clutches 770 and 776 are positioned to engage only when the front and rear wheels are aligned for forward operation of the vehicle. One or more pins and holes (including some of the same ones 774) in the frame and in clutch 770 are positioned to engage only when the rear wheels are aligned for forward operation of the vehicle. A dial 784 turned with the steering wheel 778 indicates when the front wheels are straight or shifting from two wheel steering and vice versa. The ratio of the gearing between shafts 764 and 764' and each caster is equal, so that casters turn substantially equally when turned. Gear 669 is secured on shaft 764' for automatic steering.

Referring to FIGURE 10 the control truck 630 can be made to steer as tiller 120e to guide on a laser or light S, but since a slight turning of the guide truck will throw the rows off, the use of a straight pipe or pipes for track 624, FIGURE 1 is preferred.

Referring to FIGURES 11 through 15 for a preferred variation of the tiller. This tiller can hitch up existing farm implements and draw them around as a tractor and not require right-hand and left-hand plows or implements for alternate runs. Instead of the tiller swiveling on a truck as in FIGURES 12 and 13 of my Patent No. 3,186,493, this tiller swivels 180 degrees around a caster whose wheel stays substantially stationary during this indexing swivel. This tiller indexes at opposite ends of travel on a caster at opposite ends of the tiller.

Figure 11:
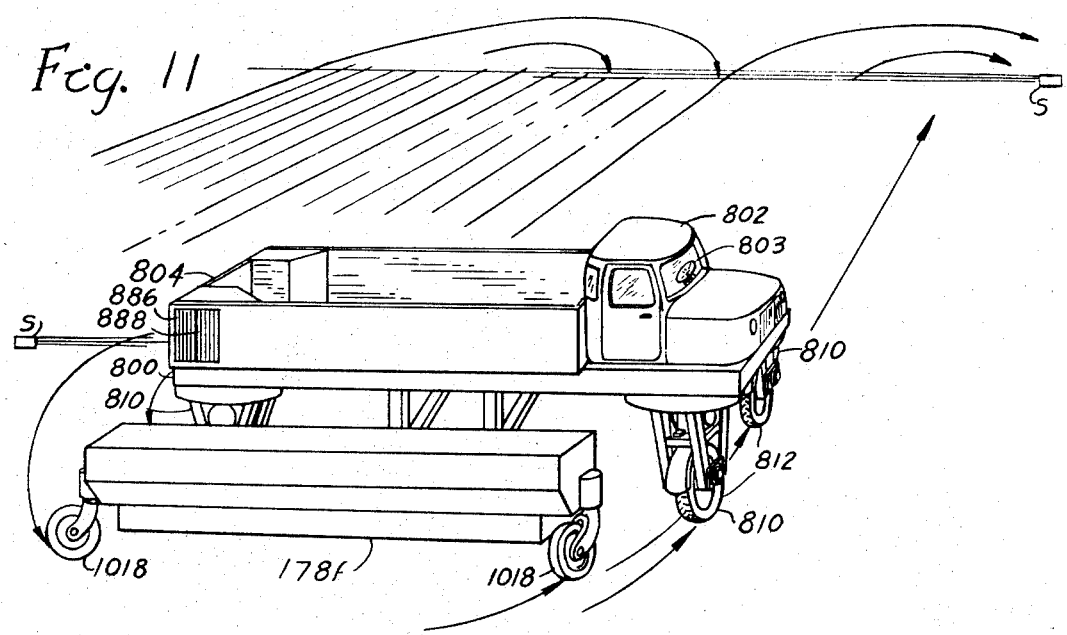
FIGURE 11 is a side perspective of a preferred tiller making a turn in a field.

As seen from FIGURE 11 the tiller preferably is in the form of a truck having a rectangular frame 800, cab 802 with seat and steering wheel 803 for driving on roads and around the farm, and a dump box 804 or other type of body or farming equipment mounted thereon.

The frame of the tiller is supported on a powered swivel caster 810 at each corner. Each caster has a tractor wheel 812 preferably driven by chain and sprocket 814 from gearhead motor 816 mounted in the caster over the wheel. Hydraulic motors can optionally be used. An engine 102f drives generator 818 to furnish power to motors 816 and drives pump 148 for hydraulic controls and actuating devices.

As an alternative to thrust bearings each caster has a top circular plate 820 with angle ring 822 turned legs in welded around the perimeter to which monorail trolley wheels 824 are secured faced out to roll in a channel ring 826 turned legs in and welded or bolted on each corner of the frame. To each plate 820 is welded a column or tube 828 extending above the plate central on the swivel axis of the caster. On each tube 828 on the front end casters is slipped a steering tie rod plate 830 each having an arm 832, FIGURE 15, connected by tie rod 834 in a usual manner and knuckle arm 836 extending from one plate 830 to which the steering rod 838 is connected through usual steering devices as on an automotive vehicle to steering wheel 803.

A disk 842 is next slipped on and secured to each central column 828 for turning the caster. Disks 842 each have on radial hole 844 on the periphery into which pin 846 secured on tie rod plate 830 slides axially as biased by a spring. A flexible cable 850 is secured to the opposite outer end of each pin 846 and run to a knob K1 on the dashboard in the cab, whereby the operator can pull out the pins for tilling. A finger and plate 854 is pivoted to the dash to alternately lock out and cover the knob when pushed in and only uncover the driver's switch KS when the knob is locked in or out for safety. Holes 844 in the disks 842 on the rear casters are not needed.

Next above each disk a pinion 856 is slipped on each column 828. A rack 858 engages each pinion 856 for automatic steering of the casters through over 180 degrees of travel as shown by arrows in FIGURES 11 and 12. A pinion 856 on the rear right of the tiller is secured tight on the caster column, FIGURE 15. The remaining pinions 856 are retractably pinned to the disk below with a pin 860 in a hole 861 in the pinion and disc to couple the pinion to the disk for steering with the gear racks. The pin on each of two diagonally opposite casters, front right and rear left, is the rod of a through rod cylinder 862 mounted on top of the pinion 856. Cylinder 862 lifts its rod, the pinion pin 860, from the disks to enable the tiller to pivot on that caster. Pins 860 retract from the disk but remain in the pinion and are forced down under spring pressure. A flexible cable 863 is secured to each front pin 860 and run to knob K2 on the dash along side of knob K1. Plate 655 is pivotally mounted to cover over and extend under alternate knobs K2 and K1, and so that only when one knob is in and the other out is the driver's key switch KS uncovered to prevent transfer of steering control while the vehicle is operating. Knob K2 also has contacts which disconnect battery 688 from steering controls to prevent inadvertent operation of the steering while the vehicle is set for road operation.

Racks 858 at each end of the tractor are connected by a rod 864 and cylinders 866 and 868 each secured head end to a rack 858 on adjacent casters. Cylinder 866 has a stroke for revolving its caster 90 degrees. Cylinder 868 has a stroke for revolving its caster the few degrees required to track when the tiller is pivoted on the diagonally opposite caster. Each rod 864 is the piston rod for a cylinder 866 and 868 on each end of the tiller and is an automatic steering rod. Each rod 864 is held and shifted axially by a clamp 870 connecting the rod to chain 872 run around four sprockets 874 pivotally supported in a horizontal plane on the bottom of frame 800 to shift rods 864 equally in opposite directions to turn casters 810 equally in the same direction. To one sprocket 874 is secured a pinion 876 engaging rack 878 connected to the piston of double-acting cylinder 880 for steering the casters. Cylinder 880 is controlled by a three-position reversing double-solenoid valve 882, alternate solenoids being energized to turn the casters oppositely. The solenoids are connected to a double-pole three-position selector switch 884 to choose the desired control.

The selector 884 is turned to the left to connect the preferred photo-electric steering controls. Photoelectric cells 886 and 888 are secured respectively rearward and forward of the center line through the wheels on one end of the tiller. A set of cells 886 and 888 are on each side of the tiller to guide on lamps 642 spaced double the span between front and rear wheels. Cells 886 and 888 are connected to amplifiers 890 and 892 respectively, whose outputs are connected to operate relays 894 and 896 respectively. In the left-hand position of switch 884, relay 894 connects the left-hand solenoid of valve 882 across battery 688, and relay 896 connects the right-hand solenoid of valve 882 across battery 688. When light 642 hits cell 886 relay 894 connects line 898 from the positive battery 688, front contacts of relay 894, switch 884 to the left-hand solenoid of valve 882, all in series to ground of battery 688, throwing valve 882 to the left, connecting pump 148 to the right-hand end of cylinder 880 and connecting the left-hand end of cylinder 880 to tank 246, pushing rack 878 to the left, revolving chain 872 clockwise, turning casters 810 counterclockwise, driving the tiller to the left when traveling away from light 642. When the light hits cell 888, relay 896 connects line 898 from battery 688, front contacts of relay 896, switch 884, right-hand solenoid of valve 882, all in series to ground of battery 688, throwing valve 882 to the right, connecting pump 148 to the left-hand end of cylinder 880 and connecting the right-hand end to tank 246. When the tiller turns around the cells 888 and 886 on the opposite side will be reversed relative to light 642 and will guide on the next light 642. The tiller can thus guide on each light 642 for a round trip.

The selector switch is turned to center to control steering with spring-centered double-throw limit switches 900 located one at each end of the tiller for guiding on a furrow or taut wire 902. Switches 900 each have a horizontal wheel 904 for following a furrow and a grooved wheel 906 for following a taut wire 902. Each limit switch 900 connects line 898 from the positive of battery 688 to line 912 or 914 when thrown to the right or left respectively. Lines 912 and 914 are connected through right and left pole of selector switch 884 to the solenoid on the right and left of valve 882, ground to negative of battery 688, all in series, to steer the tiller to follow the guiding furrow or wire.

When the selector switch is turned to the right, single-pole double-throw spring-centered manual steering switch 916 controls steering. The blade of switch 916 is connected to line 898 from the positive of battery 688 and connects to right and left poles of selector switch 884 to the right and left solenoid of valve 882, to ground to battery negative, to turn the casters clockwise or counterclockwise respectively.

Figure 12:
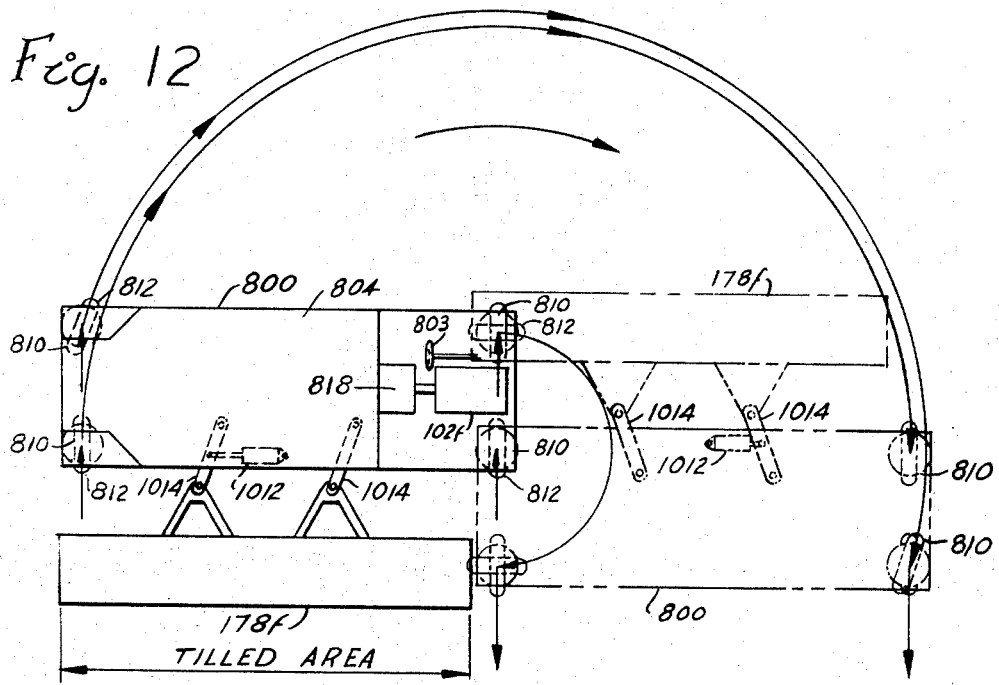
FIGURE 12 is a schematic plan of the tiller of FIGURE 11 making a turn at the opposite end of the field.
Figure 13:
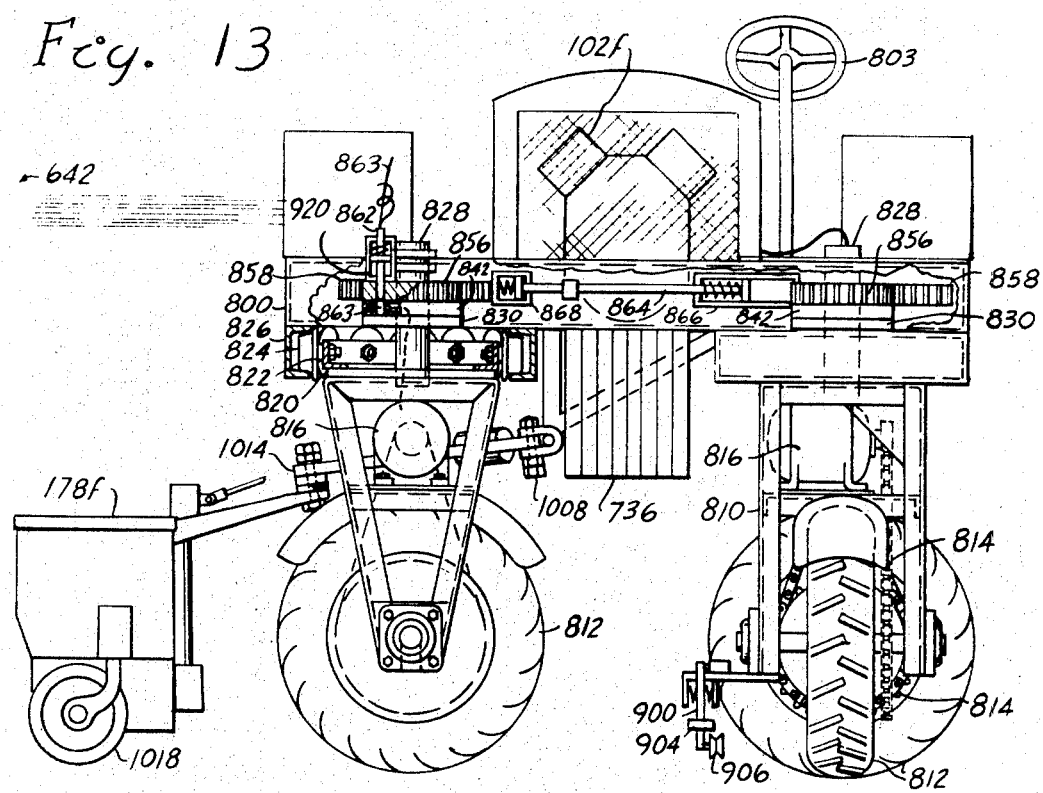
FIGURE 13 is a front view of this tiller with portions cut away to show construction.
Figure 15:
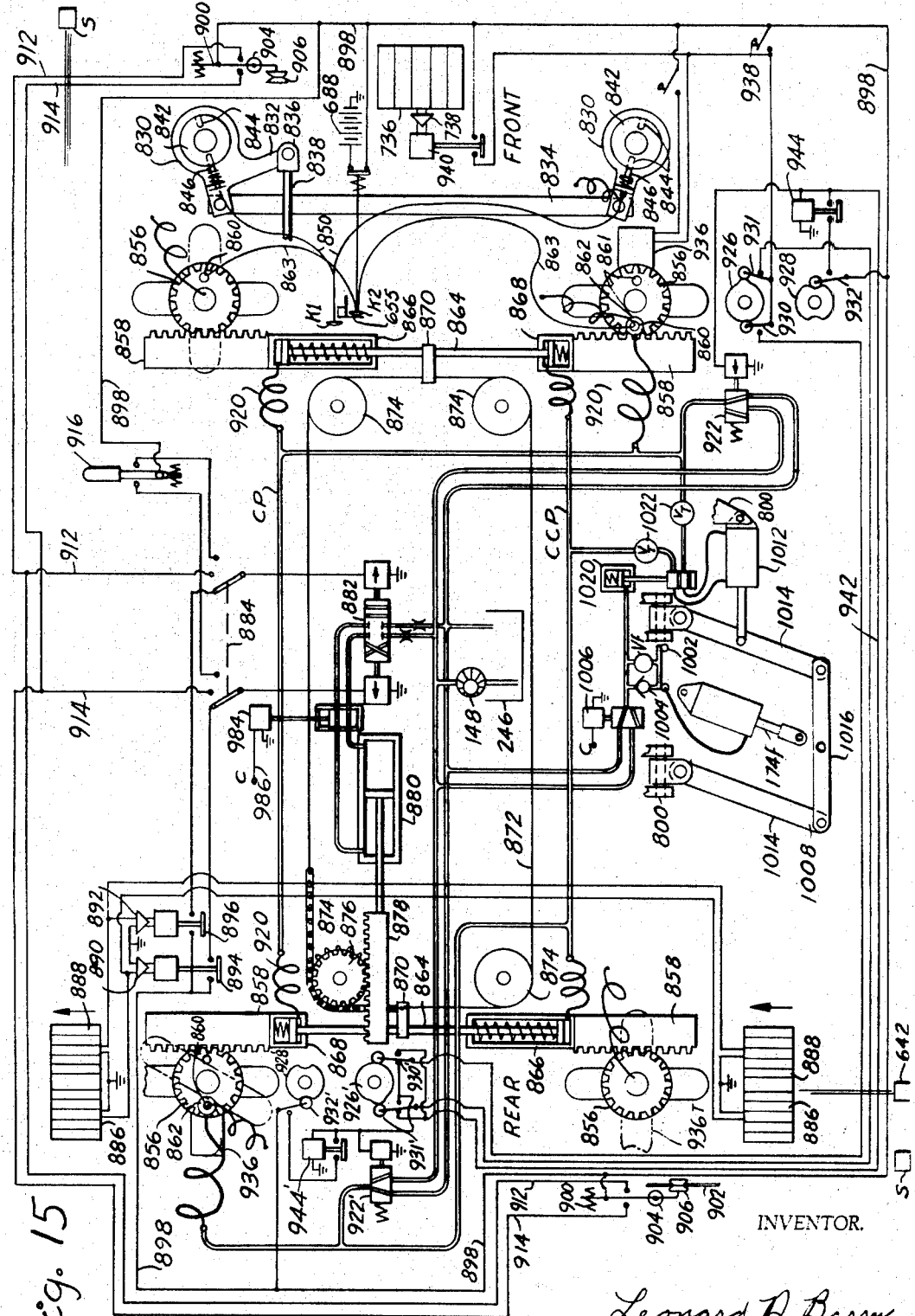
FIGURE 15 is a schematic plan of the steering, swiveling, and implement lift and shift controls for the tiller of FIGURE 11.

The tiller swivels 180 degrees around opposite casters at opposite ends of travel. The pin of the caster to be the pivot is first pulled by pressuring cylinder 862; the adjacent caster at the same end is turned 90 degrees by cylinder 866; and the opposite caster from that on which the tiller is to pivot is turned a few degrees by cylinder 868 to track as shown in FIGURE 12. To the head end of each cylinder 862, 866, and 868 is connected a flexible hose 920 to allow movement of the cylinder relative to frame 800. Hydraulic lines connect each cylinder 866 and 868 on the same side of the tiller with pin-lifting cylinder 862 on the opposite side, FIGURE 15, to form pivot hookup CP for clockwise pivot and CCP for counterclockwise pivot, whereby when one is pressured the vehicle is steered to pivot on the caster whose pin is pulled. A two-position two-passage solenoid valve 922 controls pressure to each hookup. Valves 922 are each controlled by a photoelectric cell 736 and cams 926 and 928 on each pivot caster. The caster wheels are at right angles to the sides of the tiller when the racks are centered and cylinders 866 and 868 exhausted. Cylinders 866 and 868 are preferably double acting for positive steering control, but are shown with spring returns to simplify the drawing. The front and rear pivot casters have an index start cam 926 and 926' respectively and an index hold and stop cam 928 and 928' respectively secured on their columns to turn therewith. For reference, they are positioned as shown in FIGURE 15 relative to the wheel of the caster on which they are mounted shown directly above. Cams 926 and 926' each have one lug, and cams 928 and 928' each have two dents diametrically opposite. Limit switches 930 and 931 engage cam 926, and limit switches 930' and 931' engage cam 926' at points diametrically opposite to be alternately closed by the lug on that caster when the tiller has pivoted on that caster at the end of alternate runs. Limit switches 932 and 932' engage respectively cam 929 and 928' each to close while the tiller pivots on their caster. The lugs on cam plates 926 and 926' face endward when the casters are turned for tilling. The right front caster is selected to pivot when the lugs face in opposite endward directions. The left rear caster is next to pivot when the lugs face one direction endward. In swiveling, the tiller turns 180 degrees relative to the lug on the pivot caster, so that when the tiller pivots the limit switches on each cam 926 and 926' reverse on alternate swivels. Limit switch 932 or 932' is closed to complete the swivel.

The tiller is controlled to index by light from lamps S or by odometer 936 or by manual switch 938.

Two lamps S each direct a beam of light along opposite boundries of an area to be tilled from opposite ends of the field. The tiller runs back and forth between these boundries. A photoelectric cell 736 on the front of the tiller intercepts this light at opposite ends of field from opposite directions. Cell 736 is connected to amplifier 738 whose output is across the coil of relay 940. Relay 940 connects line 898 from the positive of battery 688 to both limit switches 930 and 931 that engage cam 926 on the right front caster, from these to respectively limit switches 930' and 931' engaging cam 926' at the left rear caster, high contacts of switches 930' and 931' connected by line 942 to coil of relay 944 and solenoid of valve 922 in parallel to ground of battery 688, and low contacts of these limit switches at the left rear caster connected by line 946 to coil of relay 944' and solenoid of valve 922' in parallel to ground return to battery 688. Cam 928 controls a holding circuit for relay 944 and valve 922 from the positive of battery 688, line 898, limit switch 932 of cam 928, front contacts of relay 944, line 942 to coils of relay 944 and valve 922 in parallel to ground of battery 688. Likewise cam 928' closes a holding circuit for relay 944' and valve 922' from the positive of battery 688, line 898, limit switch 932' of cam 928', front contacts of relay 944', line 946 to coils of relay 944' and valve 922' in parallel to ground of battery 688. The coils of solenoids 922 and 922' are connected in parallel with the coils of relays 944 and 944' respectively to be energized alternately each through both sets of index swivel switches 930-931 and 930'-931' to pressure alternate hookups CP and CCP on alternate turns to turn the tiller oppositely at opposite ends of the row to turn to successive runs on only one side of completed runs. Valve 922 connects pressure from pump 148 to cylinders 862 at the front and 866 and 868 at the left to turn the casters for clockwise swivel. Valve 922' connects pressure from pump 148 to cylinders 862 at the rear and 866 and 868 at the right to turn the casters for the counterclockwise swivel.

Figure 14:
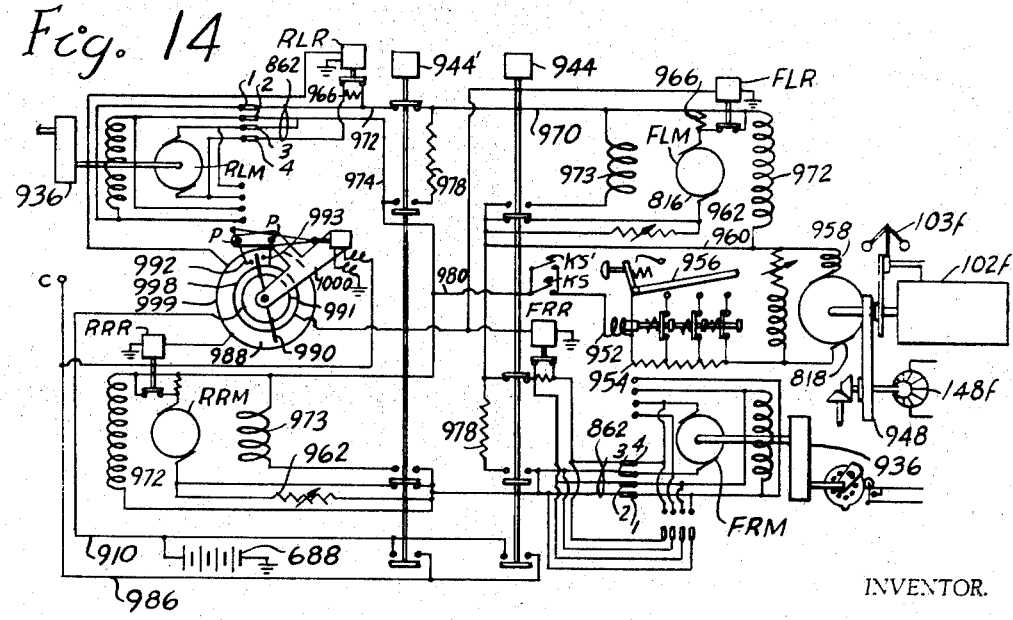
FIGURE 14 is a schematic plan of the drive for the tiller of FIGURE 11.

Referring to FIGURE 14, the drive has engine 102f controlled by governor 103f, pump drive and power takeoff 948, generator 818, and motors 816 located and identified by FLM, FRM, RLM, and RRM on the front left, front right, rear left, and rear right caster respectively. The motors are similar. The two motors on each side of the filler are connected in series across the generator in series with starting and speed control, here shown as the coil of overcurrent relay 952 and starting resistance 954. Resistance 954 is bypassed in steps through contacts of the overcurrent relay each in series with contacts on a manual or foot controller 956 latched closed to the desired speed for automatic operation. Relay 952 shorts resistance 954 in steps to the setting of controller 956 as the starting current diminishes.

Each motor is driven at the required speed for the swivel. Relays 944 and 944' have contacts for stopping the motor on respectively the front right and rear left pivot caster when the tiller pivots thereon and for reducing the speed of the caster turned 90 degrees for the pivot.

The drive circuit for the left-hand side of the tiller is from the positive of generator 818, its series field 958, line 960, adjustable resistor 962 in parallel with back contacts of relay 944, armature of FLM, resistor 966 in parallel with back contacts of relay FLR to line 970. This motor has a shunt field 972 connected from line 960 to line 970 and an additional shunt field 973 connected in series with front contacts of relay 944 from line 960 to line 970 to reduce speed when the caster is turned 90 degrees for the index swivel. The left-hand drive circuit continues from line 970 through back contacts of relay 944', line 972, contact 1 on the rear pin 962, shunt coil of RLM, contact 2 on the pin, line 974; in parallel from line 772, another resistor 966 in parallel with back contacts of relay RLR to contact 4, armature of RLM, contact 3, to line 974, and in parallel from line 970, resistor 978 in series with front contacts of relay 944' to line 974 to bypass RLM when cut out, and from line 874 in series, line 980, switches KS and KS' in parallel, coil of overcurrent relay 952, starting resistor 954, to negative of generator 818. Pin 862 makes motor connections 1, 2, 3, and 4 to the caster and reverses the motor when inserted in opposite holes 863 in the disk. The right-hand drive circuit is the same only reversed front to rear and makes connections through both pins 862 and 846 to FRM, so that the motor is disconnected when the tiller swivels on the caster but is connected for both tilling and road operation by respectively contacts 1-4 on both pins 862 and 846.

The controls shown in FIGURES 14 and 15 are in straight sidewise tilling position which is 90 degrees counterclockwise from forward road running position. The tiller is changed from tilling to road steering by pushing lever 916 forward with switch 884 forward, energizing the forward solenoid of valve 882, shifting the piston of cylinder 880 forward, turning the casters clockwise to the forward end of travel at which pins 846 align holes 844 when the steering is turned straight. Pins 862 are pulled disconnecting tilling steering and pins 846 pushed in connecting road steering to the front casters. The rear casters are held straight by valve 882 closing connections to cylinder 880, but could be pinned straight to the frame for added safety.

The tiller is reversed in road operation by aligning steering straight, pulling pins 846, pushing in pins 862, and pulling switch 916 back, pivoting all the casters counterclockwise to the end of travel 180 degrees from forward. Road steering can then be connected for the reverse position of the casters as for forward operation except pins 846 drop in holes 180 degrees from the forward operating holes. The tiller can be backed up straight without connecting this reverse steering.

Normally-open solenoid valve 984, FIGURE 15 is energized to block cylinder 880 to prevent operation of the steering control during the swivel. Its solenoid is connected in a circuit from the positive of battery 688, FIGURE 14, line 898, front contacts of relays 944 and 944' in parallel to line 886 broken at c to FIGURE 15, solenoid of valve 984 to ground of battery 688.

Skew control is provided by gyroscope 988 driven by any suitable means and having a compass switch 990 connecting a ring 991 to contact 992 or 993 if the tiller skews clockwise or counterclockwise respectively. Contacts 992 and 993 are pivoted at p and p' and are retracted from the compass by solenoid 994 against spring pressure. Solenoid 994 is energized by a circuit from the positive of battery 688, line 898, front contacts of relays 944 and 944' in parallel to line 986, solenoid 994 to ground of battery 688, so that the needle is freed from the contacts when the tiller swivels. Contacts 992 and 993 respectively engaging rings 998 and 999 and are supported together with solenoid 994 on arm 1000 pivoted on the centerline of the gyroscope compass to be set to the desired direction for working. Ring 991 is connected to line 898 to the positive of battery 688; ring 998 is connected to coils of relays FLR and FRR to ground; and ring 999 is connected to coils of relays RLR and RRR to ground; whereby when the tiller turns from its fixed course set by the position of arm 1000 about its axis (except at the ends of travel when turning) the compass makes contacts which lift relays FLR and FRR or RLR and RRR respectively to reduce the speed of the motors on the end which is ahead.

Any suitable implement lift and hitch can be used on the tiller. One or more lift cylinders 174f and pressure hose connections 1002 for connecting to implements are connected through check valve 1004 to solenoid valve 1006 which connects them to tank 246 when valve 1006 is deenergized and to pressure from pump 148 when valve 1006 is energized. Valve 1006 is energized in parallel with valve 984 of which it can be a part. Check valve 1004 blocks exhaust of cylinder 174f and hose at 1002 and is bypassed by hand valve Vf to set the lowering speed or hold the implements raised. Additional lifts, power takeoffs, etc. can be provided for implements mounting on the left or right sides, bottom or top of the tiller. For mounting implements under frame 800 implement lifts as in my Patent No. 2,969,199 are preferred.

The hitch 1008, best shown in FIGURES 12 and 15 detachably connects implement 178f to the tiller and is mounted on frame 800 and connected by cylinder 1012 to shift the implement, which is slightly shorter than the tractor, along the side of the tiller. For plowing, the hitch is preferably on the trailing side of the tiller as shown in FIGURE 12 and is shifted by cylinder 1012 alternately for sucessive runs toward the front and rear to plow behind the tire tracks adjacent the plowed run and to be kept from behind the caster next to the pivot if attached by tongue. For grain harvesting the hitch is attached to the leading side of the tiller and cylinder 1012 positioned to shift the implement to harvest ahead of the tractor wheels. Cylinder 1012 can be replaced by a bar where shifting is not desired. Though the hitch could be mounted to slide along either side of the tiller it is more simply mounted to swing and is preferably in the form of a horizontally supported parallelogram linkage with two bars 1014 pivoted at one end to frame 800 and pivotally connected by the implement 178f or by bar 1016 between the outer ends. Implements 178f secured on bars 1014 is supported on casters 1018 if desired to take the weight and remains parallel to the tiller even when swiveling. The tongue of trailing implements can be pinned to the center hole in bar 1016, bars 1014 then being of the required length for clearance in turning.

Cylinder 1012 is pivotally connected between frame 800 and hitch 1008 and is controlled by a spring closed pilot valve 1020 whose pilot cylinder is connected to the outlet of valve 1004. Valve 1020 when opened connects hookup lines CP and CCP to opposite ends of cylinder 1012 through needle valves 1022 to swing the hitch mounted on the trailing side inward slowly as the tiller swivels on each pivot caster and outward slowly if the hitch is mounted on the leading side of the tiller. Needle valves 1022 regulate the speed of the swinging of the hitch to last substantially for the duration of the swivel. Valve 1020 closes when the swivel is completed and holds the implement hitch shifted for each run. This slow swinging of the trailing hitch throughout the turn helps tongue coupled implements to turn with clearance.

OPERATION OF PIVOTING TILLER

(Light Controlled)

Light S and 642 are set out, defining an area to be tilled. The tiller is driven as a trunk into position and stopped so a lamp 642 shines between cells 886 and 888 as in FIGURE 15. The operator turns the front wheels straight, pulls out knob K1 disconnecting road steering, pushes in knob K2 connecting four wheel steering and battery 688 to line 898 for tilling, throws switch 884 forward and switch 916 back and hold until wheels turn straight sidewise. Then he throws switch 884 fully back. He opens valve Vf to lower the implements at the desired speed. With switch KS open he sets the desired speed, gets off the tiller and closes switch KS' in parallel with open switch KS but located along the side of the tiller to start the motors which run the tiller straight as guided by lamp 642 and gyroscope 988 until lamp S shines on cell 736, lifting relay 940, lifting relay 944 and energizing valve 922 to connect pressure to hookup CP, pressuring cylinders 862, 866, and 868. Cylinder 862 operates at low pressure first, pulling out pin 862 which disconnects motor FRM and its caster's steering. Then cylinders 866 and 868 respectively quickly turn the front left caster 90 degrees clockwise and the rear left caster a few degrees for correct tracking. Relay 944 energizes valve 984 blocking cylinder 880 from turning the casters and energizes valve 1006 connecting pressure to cylinder 174f to lift the implements and connecting pressure to valve 922 which opens to connect pressure in hookup CB to cylinder 1012 through restriction 1022 to shift the implements slowly toward the front. Relay 944 also connects a resistor 978 across where motor FRM is disconnected and cuts the relative speed of motor FLM to correspond to the length of the arc of its caster in turning the tiller relative to the length of the arc of a rear caster. Limit switch 932 closes after the swivel is entered and holds valve 922 and relay 944 energized until opened by cam 928 when the 180 degree turn is sufficiently completed. This releases valve 922 and relay 940. Valve 922 then exhausts cylinders 866 and 868, which return their casters quickly back about straight sidewise with aid of springs or preferably reverse pressure, and exhaust cylinder 862 which drops pin 862 in the opposite hole 863 connecting motor FRM reversely. Relay 944 reconnects the front motors for forward operation and deenergizes valve 984 which opens passages to cylinder 880 for steering control and deenergizes valve 1010, which exhausts cylinder 174f, dropping the implements at the speed set by valve Vf and drops valve 1020 blocking hitch cylinder 1012 in its new position for the next run of the tiller. The tiller then runs to the starting end of the field where another light S energizes cell 736, lifting relay 940, connecting power to relay 944' and to valve 922' initiating a similar pivot on the left rear caster. The tiller thus continues until a switch KS is opened manually or by a trip 186f in the field. The odometers 936, FIGURE 14, can serve as a safety limit in case a light S is missed. They are each driven from a wheel or the motor on a pivot caster through gear reduction to turn forward to add and in reverse to subtract distance when the motor on the swivel caster is driven in reverse and have an adjustable cam and limit switch LS set at the starting position to limit the distance on successive round trips which if exceeded either reverses the tiller as does lamp S or opens the drive circuit as desired. An odometer 936 similarly connected on a caster not used as a pivot can shut off the tiller at a total distance limit as when a bin should be full or empty, or various limit switches can stop the tiller as described.

Referring to FIGURE 16, the wheel on which the tiller swivels preferably is locked to the land to prevent possibility of it turning with the swiveling of the tiller thereon. Wheel-to-land lock arms 1030 are pivotally secured at 1032 to each side of the caster frame of the pivot casters and extend down as shown to drive prongs into the ground in front of and behind the wheel to keep the wheel from pivoting. Cylinders 1036 are pivotally connected between the frame 810 and an arm 1030 on each end of the frame to lift and lower the arms. Pressure is connected from pump 148 to the head ends of cylinders 1036 through hoses to swivel joint 1040 on the center line of pivot to pipe 1042 to hookup CP or CCP as shown in FIGURE 17. Spring 1044, FIGURE 16, in cylinder 1036 lifts the arms when the cylinder is connected to exhaust, tank 246.

Referring to FIGURE 17 for a variation of the steering arrangement shown in FIGURE 15, the rod 1050 of steering cylinder 880' extends out each end of the cylinder. The ends of rod 1050 are connected by links 1052 to bell cranks 1054 pivotally secured at 1056 to the frame of the tiller to actuate respectively the front and rear steering rods 864. Otherwise the steering control and operation is the same as in FIGURE 15. This construction is simpler and more rugged than that of FIGURE 15.

Having thus described a few embodiments of my invention which can have many variations, it is to be understood that I do not wish to be limited to only variations shown and described herein but I contemplate to cover all modifications and variations which fall within the true spirit and scope of my invention.

I claim as my invention:

1. A tractor which comprises in combination a frame, a plurality of swivel casters supporting said frame, motor means for operating said tractor, power transmission means for connecting said motor means to drive said casters for propelling said tractor, the wheels of said casters being aligned in the same direction for tilling, steering means connecting said casters to turn together, guide means providing a line of energy at a plurality of locations parallel along a field for guiding the tiller, steering control means for operating said steering means to follow said line of energy, steering control reversing means for reversing control of said steering means when said tiller is reversed, means for relatively moving said guide means and tiller at the end of the line of tilling to cause the casters to reverse the tiller, index control means including mechanical reverse motion check latch means which engages when said casters are turned in a given direction to indexing position, said steering control reversing means being connected for reversing steering control after the engagement of said latch, whereby said casters are locked to index the tiller until said steering control means intercepts a line of energy along the field which completes the approximately 180 degrees turn of the casters and guides them on the reverse run.

2. A tilling system which comprises in combination, a first vehicle, a second vehicle having swivel casters for supporting and propelling said second vehicle and powered steering means for said casters, said second vehicle being adapted to support earth working implement means, guide means along the field for guiding said first vehicle, ray means carried by said first vehicle for guiding said second vehicle along a line at an angle with respect to the line of movement for said first vehicle, means for indexing said first vehicle a predetermined distance along the field when approached by said second vehicle, a row of photoelectric cells for controlling said steering means to hold said second vehicle on the ray, steering control for indexing said second vehicle to follow the ray as it is indexed and including cell means beyond each end of said row for turning the casters in the same direction as the adjacent cell but fast, a reverse check ratch comprising a pawl and a loop on said steering means for said pawl to follow around when said casters are turned from alternate ends of steering travel, and means for reversing the steering controls to have reverse effect for locking said casters with said ratch when turned to index position, said first vehicle indexing at least as fast as said second vehicle, and means for reversing the direction of movement of said tiller after a predetermined distance out on said ray, whereby an area is covered by said second vehicle with forth and back and indexing movements.

3. A system for automatic tilling which comprises in combination a vehicle adapted to draw earth working implement means, means for propelling said vehicle, guide means including means carried by said vehicle for guiding said vehicle along a path fo rtilling, wheel means supporting said vehicle and steering control means for quickly relatively repositioning said wheel means at each end of travel to reverse the direction of said vehicle, and steering locking means on said vehicle for holding said steering means in an intermediate fixed position for a distance of predetermined length to provide an index movement of said vehicle whereby said vehicle covers an area with back and forth and indexing movements over a predetermined path having as many movements as desired.

4. In a system as in claim 3, a first implement lift and a second implement lift on said second vehicle, a directional tilling implement connected to each implement lift to till in opposite directions with alterante implements, a cylinder for actuating each said lift, a pressure source, a reverse valve for connecting said source to the lift ends of either cylinder according to the position of said valve, and means intercepted by movement of said vehicle for reversing said valve at each end of travel of said vehicle to lift alternate implements on successive runs of said vehicle and for lowering alternate implements for alternate operation depending on the direction of travel.

5. A tilling system including in combination, a track along one side of an area to be tilled, a control truck on said track, an implement car including swivel casters for supporting said car on the ground, means for driving said casters to propel said car, steering means connecting the casters to swivel together, a pressure system including a double acting cylinder to operate said steering means through more than 90 degrees each side of a position parallel said track, a reversing valve for controlling pressure to opposite ends of said cylinder, check means for preventing the revesre of said cylinder when turning said casters in one direction in substantially mid position, and means controlled by said check to reverse said valve when reverse movement of said cylinder is checked to lock said cylinder in intermediate position for indexing the tiller, guide means on said truck for providing a radiant beam to guide said car, and means on said car controlled by said beam for controlling said cylinder according to the position of the car relative to the beam to keep the car on the beam, means for swiveling said casters about 180 degrees in opposite directions at each end of travel, and means for indexing said truck controlled by movement of said car, said check means locking said casters from reversing when turned substantially parallel said track whereby said car runs back and forth and indexes to till parallel rows while the wheels of said casters rotate in one direction.

6. In a tilling system, a tilling vehicle, means for propelling said tilling vehicle, means for guiding said tilling vehcle, steering means on said tilling vehicle and steerng control means for controllng said steering means to follow said guiding means, means for reversing the travel of said tilling vehicle after a predetermined travel, means for reversing the connection between said means for guiding and said steering control when the travel of said vehicle is reversed so said vehicle can steer on said guide means when reversed, means for indexing said vehicle including means for locking said steering when indexing said vehicle, whereby said tilling vehicle continuously moves back and forth and indexes to cover an area of ground.

7. An automatic farming system which comprises in combination; a tilling vehicle and a control vehicle on a field to be tilled, means for guiding said control vehicle along one side of the field, means for emitting an energy beam from said control vehicle along a line on which said tilling vehicle is to operate, first drive means for moving said control vehicle in steps to index the beam for tilling parallel rows, control means for initiating the indexing of said control vehicle according to the position of said tilling vehcle, casters supporting said tilling vehicle, steering means for turning said casters together through over 180 degrees of arc, second drive means for driving said casters to propel said tilling vehicle, two first steering controls connected to turn the casters slowly for correcting the movement of the vehicle to guide on the beam, each of said first steering controls being adapted to turn the casters in a direction opposite from that of the other first steering control, two index steering controls each on an opposite side of said first steering controls and connected to quickly turn the casters in the same direction as the adjacent first steering control when energized by the beam, said control vehicle being indexed at least as fast as said tilling vehicle can follow to cause said casters to turn for indexing, steering control reversing means reversing said steering control when the casters reach indexing position, means for locking said casters in indexing position during the index of the tiller, said index control completing the turn of the casters to complete the reverse of the tiller when aligned with the beam.

8. A tiller comprising, a frame, swivel wheel units which turn over 180 degrees supporting said frame, means for propelling said frame, means for guiding said units along a run for tilling, a single control for pivoting said tiller substantially 180 degrees including means for stopping one of said wheel units at either end of the tiller according to the direction of tilling, steering means on said tiller for swiveling said wheel units as required to pivot said tiller on one of said wheel units to reverse the direction of the tiller and index it to an adjacent run, and means for releasing said wheel when said tiller is rotated substantially 180 degrees.

9. A tiller as in claim 8, an implement connected to said tiller and means for lifting and holding said implement from working position while said tiller is pivoting.

10. A tiller as in claim 8, an implement hitch pivotally mounted centrally on the side thereof to swing horizontally controlled by the swivel position of the casters to shift an implement sidewise to till along a particular wheel unit of the tiller.

11. An implement hitch as in claim 9 pivotally mounted to swing from side to side of said tiller, and means controlled by the steering of the tiller for shifting said hitch slowly throughout substantially the full index turn of said tiller to enable sharper turns with the implements.

12. A tiller system including in combination, a tiller vehicle which comprises a frame having a front, rear, and sides, a swivel caster supporting each corner of said frame, steering means for said casters and selective to lock the said casters which are at said rear parallel the sides and release said casters at the front for manual steering, means for propelling said tiller, implement support and lift means connected to said vehicle for operation therefrom, means controlled by the rotary position of said casters relative to said frame to actuate said lift means to lift said implements when said casters are turned from substantially crosswise alignment with said frame, guide means running along a field for guiding the tiller in rows back and forth, means controlling said casters to steer on said guide means, light sources defining limits of travel for said tiller, receivers on said tiller for receiving the light therefrom for controlling said lifts to retract implements and to index said tiller to another line of tilling for controlling said steering means to quickly move to index position, means locking said casters and indexing position throughout substantially the index movement, means for quickly straightening the casters after the index for the next run, and means for lowering implements for a run of said tiller after the tiller is indexed.

13. A tiller as in claim 12, a truck body functionally secured on said frame.

14. A tiller comprising in combination; a frame substantially defining a rectangle, a swivel caster supporting each corner of said frame, a motor for driving the wheel of each said caster, a pinion concentric on the swivel of each said caster, two diagonally opposite pinions being secured to revolve with the caster swivel, the remaining two pinions being retractably, pinned to turn their caster or not, a gear rack engaging each said pinion, a cylinder secured head end to each said rack, said cylinders for the said pinned casters being of a length to rotate their caster a few degrees to turn the wheel at right angles to a line connecting the centers of these casters, the remaining said cylinders being of a length to turn their said casters 90 degrees when actuated, the rods of said cylinders which are at the same end of the tiller being connected together, means for shifting said rods to turn said casters to swivel together in the same direction, means for actuating said cylinders which are on one side of the tiller and releasing the said pin which is on the opposite side to pivot the tiller about the caster whose pin is retracted, and means for controlling the speed of the motors to swivel the tiller.

15. A tiller as in claim 14, said racks on opposite ends being on opposite sides of said pinions, said means for shifting said rods being a chain and cable loop connected to said rods, guide means for directing said loop oppositely along said rods, and power means for moving said loop around back and forth to steer said tiller.

16. A tiller as in claim 14, photoelectric means for controlling said power means to steer said vehicle to follow a radiant beam.

17. A tiller as in claim 14, control means including a double limit switch having wheel means for guiding on a taut wire, rail or furrow to control the steering of said power means.

18. A tiller as in claim 14, a gyroscope, opposite limit switch means rotatably mounted on said gyroscope to be set according to the direction of tilling to be engaged by said gyroscope if the tiller skews, said limit switch means controlling the said motors for the casters on the corner of said frame to correct skew while tilling, and means for retracting said limit switch means from control of the gyroscope while the tiller turns around.

19. A tiller as in claim 14, a tie rod arm on each of the front said casters, a tie rod connecting said arms, a knuckle arm on a front said caster, operator controlled steering means connected to said knuckle, pin means for detachably connecting said arms to steer said casters.

20. A tiller comprising in combination, a frame, swivel casters supporting said frame, means for propelling said frame, steering means for pivoting said frame on a caster at either end, said steering means substantially simultaneously setting all casters at right angles to radial lines from a pivot point, and means for controlling said steering means to set to the preselected pattern.

21. A tiller as in claim 20, and means for swiveling said casters straight to parallel forward tilling position upon completing a 180 degree turn.

22. A tiller as in claim 20 wherein said means for propelling said tiller includes a separate power means on each of said casters and control means for controlling each of said power means to drive the respective casters at a speed relative to the distance from the pivot, said control means for said power means being connected to operate simultaneously with said steering means.

23. A system for automatic tilling which comprises in combination, a vehicle adapted to draw earth working implement means, means for propelling said vehicle, said vehicle having supporting wheels and steering means to turn said vehicle around; guide means for defining runs for tilling, control means carried by said vehicle for controlling said steering means for said vehicle to follow said guide means for tilling, turn control signal means running across the direction of tilling and steering control means receptive thereto for steering said wheels to turn to alternate predetermined positions at opposite ends of tilling to turn said vehicle around with fixed turning pattern to both turn and index the vehicle in one direction, said guide means being positioned to take over steering control after each turn, whereby said vehicle expandingly covers area with back and forth and indexing movements over a predetermined path.

24. A system as in claim 23, implement lift means on said vehicle, said control signal means also controlling said inplement lift to lift implements for the turn.

(References on following page)

References Cited

UNITED STATES PATENTS

| | | | |
|---|---|---|---|
| 1,162,418 | 11/1915 | Uhlrig | 180—6.24 |
| 2,109,475 | 3/1938 | Fanning. | |
| 2,339,291 | 1/1944 | Paulus et al. | 180—79.1 |
| 2,339,291 | 1/1944 | Paulus et al. | 180—79.1 |
| 2,796,816 | 6/1957 | Gray | 172—204 X |
| 2,871,961 | 2/1959 | Burch | 172—255 |
| 2,922,482 | 1/1960 | Fisher | 180—6.2 X |
| 2,994,392 | 8/1961 | Kosman | 180—45 X |
| 3,064,745 | 11/1962 | Colt et al. | 180—46 |
| 3,169,598 | 2/1965 | Finn-Kelcet et al. | 172—3X |
| 3,186,493 | 6/1965 | Barry | 172—26 |

FOREIGN PATENTS

| | | |
|---|---|---|
| 1,257,784 | 2/1960 | France. |
| 605,165 | 3/1960 | Italy. |

ANTONIO F. GUIDA, Primary Examiner

A. E. KOPECKI, Assistant Examiner

U.S. Cl. X.R.

180—6.24, 79.1